United States Patent
Loomba

[11] 3,797,603
[45] Mar. 19, 1974

[54] ELECTROMAGNETICALLY CONTROLLED SAFETY BELT RETRACTOR

[75] Inventor: Yogendra Singh Loomba, Roseville, Mich.

[73] Assignee: Allied Chemical Corporation, New York, N.Y.

[22] Filed: July 6, 1972

[21] Appl. No.: 269,349

[52] U.S. Cl. ............... 180/82, 180/103, 200/61.45, 242/107.4, 280/150 SB
[51] Int. Cl. ........................................... B60r 21/10
[58] Field of Search ..... 180/82 C, 103; 280/150 SB; 307/10 SB; 200/61.45, 61.51, 61.48, 61.58 B; 242/107 SB, 107.4; 297/388

[56] References Cited
UNITED STATES PATENTS

| | | | |
|---|---|---|---|
| 3,603,525 | 9/1971 | Pringle et al. | 242/107.4 |
| 3,610,361 | 10/1971 | Pringle | 280/150 SB X |
| 2,596,427 | 5/1952 | Nordmark et al. | 280/150 SB X |
| 3,439,932 | 4/1969 | Lewis et al. | 280/150 SB |

Primary Examiner—Evon C. Blunk
Assistant Examiner—Bruce H. Stoner, Jr.
Attorney, Agent, or Firm—Clayton Smith; John P. Kirby, Jr.; Jonathan Plaut

[57] ABSTRACT

A reel type retractor for a safety belt having the feature that an electromagnet, normally activated, and holding a cam member by virtue of an armature attached thereto, maintains a pawl out of latching engagement with the reel, thereby permitting free extension of the belt. Any interruption of the current to the electromagnet permits the reel to rotate the cam, releasing a cam follower attached to the pawl bar, and allowing the biased pawl bar to rotate into locking engagement with the reel. Current interruption can be effected by the opening of a pressure switch responsive to the hydraulic pressure in a vehicle's braking system, by the opening of an inertial switch responsive to a change in velocity of the vehicle to which the switch is attached or by both types of switches working in series.

11 Claims, 10 Drawing Figures

3,797,603
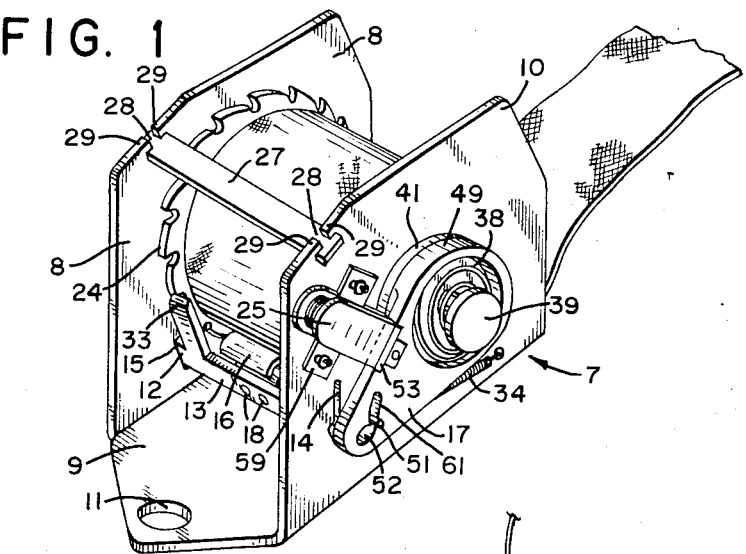
FIG. 4
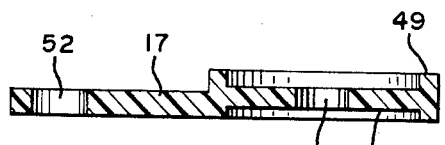
FIG. 3
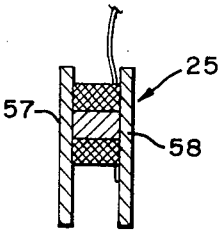
FIG. 5
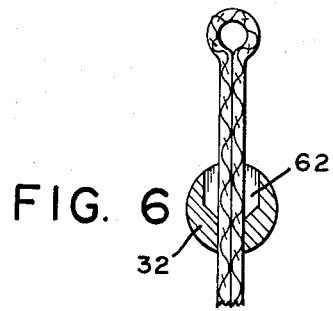
FIG. 6
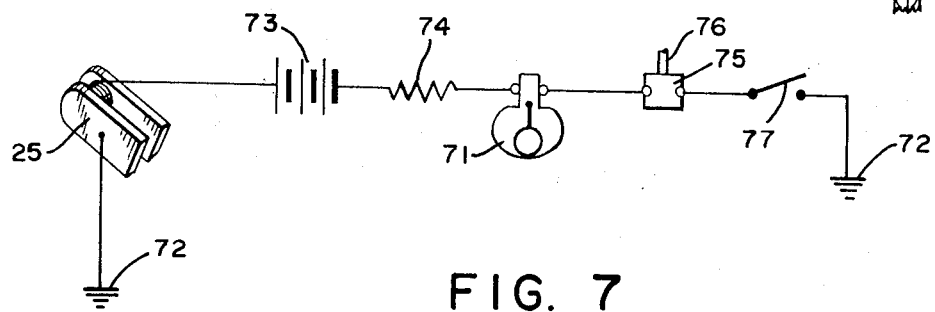
FIG. 7

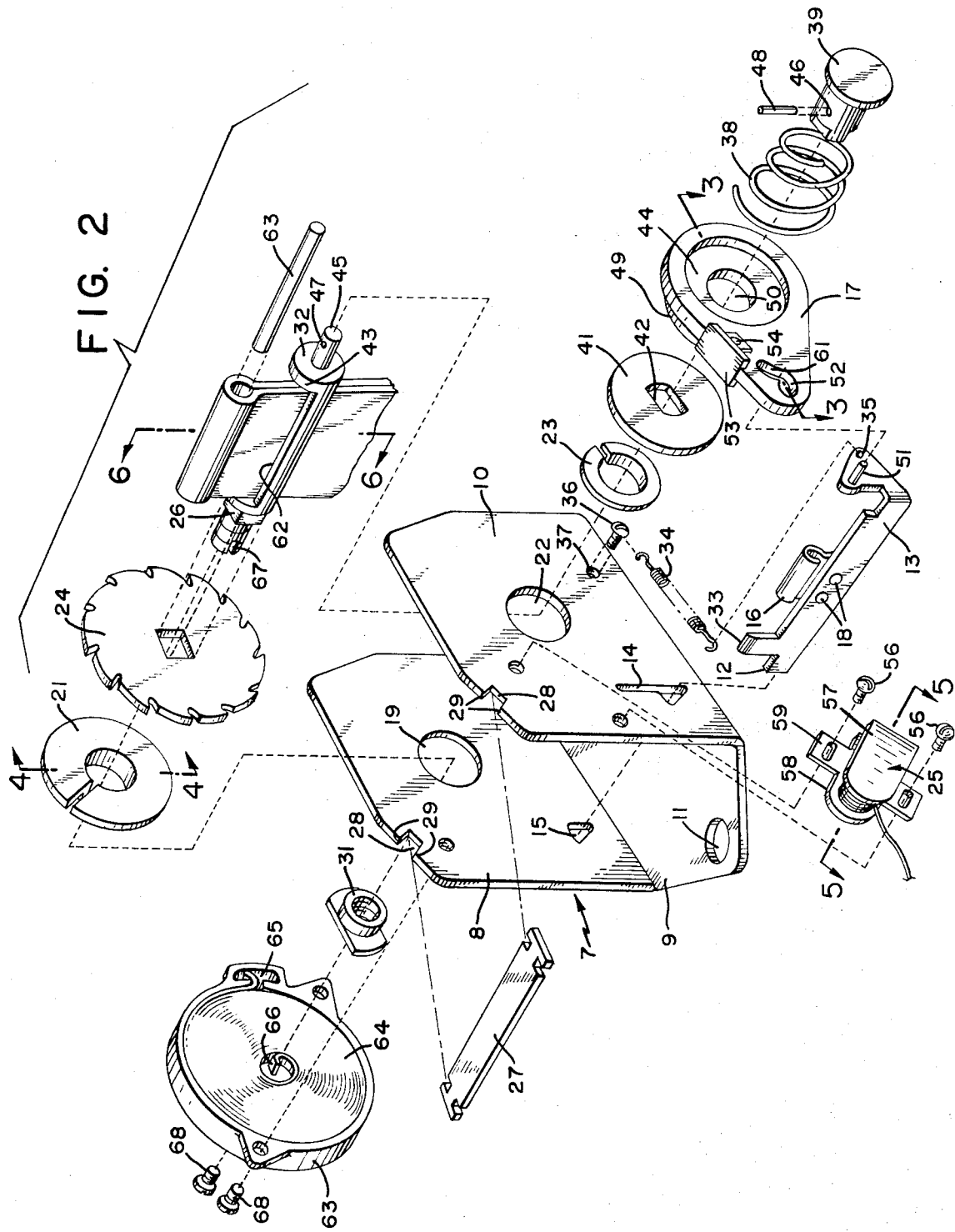

3,797,603

ELECTROMAGNETICALLY CONTROLLED SAFETY BELT RETRACTOR

BACKGROUND OF THE INVENTION

This invention relates to vehicle safety belt retractors, and more particularly to those which permit withdrawal of the seat belt for buckling or to accommodate the body motions of the individual using the belt, but which lock to restrain the wearer when conditions require it in the interests of safety.

SUMMARY OF THE INVENTION

This invention is directed to a reel-type retractor for a vehicle safety belt controlled by a normally activated electromagnet. The magnet does not function by moving components within the retractor assembly, but by serving as a holding device. As long as the magnet is supplied with current, the safety belt may be freely extended against the bias of the rewind spring, but when the current is interrupted, the reel locks to prevent further extension of the belt, therefore the retractor is fail-safe. Application of the brakes of the vehicle, a sharp change in its velocity, or both, can supply the interruption of the electric current.

More specifically, the components of the retractor of the present invention include a reel, rotatably mounted on a supporting frame and a safety belt anchored and wound on the reel for withdrawal against bias in the rewind position. The reel has at least one flange with ratchet teeth in its periphery for latching engagement in the unwind direction with a pawl having a latched position and an unlatched position, but biased to the latched position. A cam follower is attached to the pawl to follow a cam, having a first position wherein the pawl is allowed to move as a result of its bias to the latched position, and a second position wherein the pawl is prevented from moving to its latched position. An electromagnet, normally activated by an electric current, restrains the cam member by virtue of an armature attached thereto, against the tendency of an adjacent clutch disc to rotate it, and thereby maintains the pawl out of locking engagement with the reel, permitting free extension of the belt. Any interruption of the current to the electromagnet permit a clutch disc keyed to the reel, to rotate the cam, releasing the cam follower attached to the pawl bar and allowing the biased pawl bar to rotate into locking engagement with the reel. Current interruption can be effected by the opening of a pressure switch responsive to the hydraulic pressure in a vehicle's brake system, by the opening of an inertial switch responsive to a change in velocity of the vehicle to which the switch is attached, or by both types of switches connected into the electric circuit in series.

DESCRIPTION OF THE DRAWINGS

The description refers to the accompanying drawings in which like reference characters refer to like parts throughout the several views.

FIG. 1 is a perspective view of a safety belt retractor, illustrating the preferred embodiment of the invention. In the drawing, the belt is wound on the reel in the retracted position.

FIG. 2 is an exploded view of the preferred retractor of FIG. 1.

FIG. 3 is a cross sectional drawing of component 17 along line 3—3.

FIG. 4 is a cross sectional drawing of component 21 along line 4—4.

FIG. 5 is a cross sectional drawing of component 25 along line 5—5.

FIG. 6 is a cross sectional drawing of component 32 along line 6—6.

FIG. 7 is a diagram of an electrical circuit including the magnet which controls the action of the safety belt retractor, a vehicle battery, a resistance, a normally closed inertial switch responsive to deceleration of the vehicle, a pressure sensitive switch connected to the vehicle's braking system, normally in a closed position and the ignition switch or one paralleling the action of the ignition switch. The metal frame of the vehicle completes the circuit.

Figure 8:
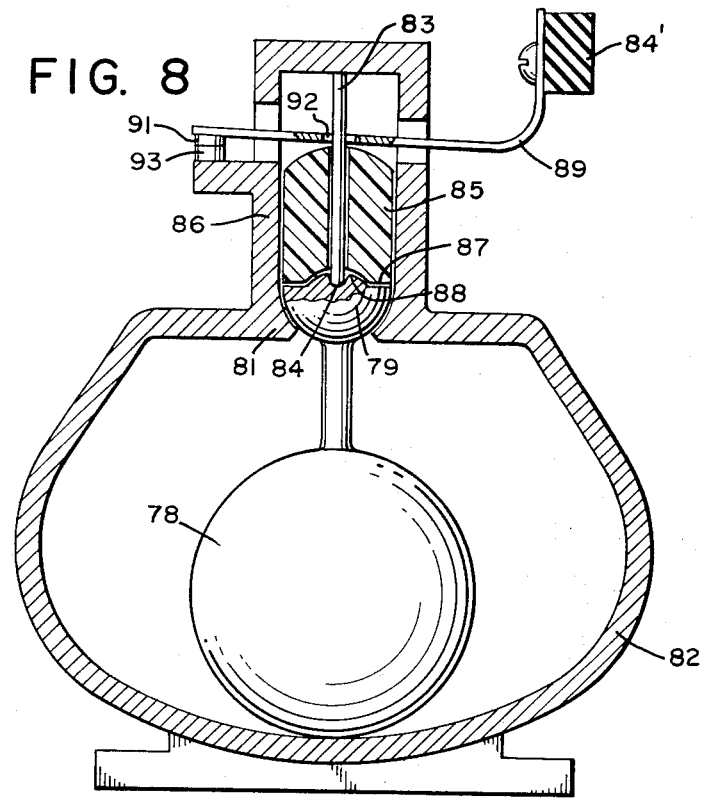
FIG. 8 is a cross sectional enlarged view of a normally closed inertial switch responsive to the deceleration of a vehicle. It is shown in its normally closed position.

Referring now to the preferred retractor assembly of FIG. 1, and particularly to the exploded view of FIG. 2 as well as the related cross sectional views of FIGS. 3, 4, 5 and 6, numeral 7 is the supporting frame of the retractor with parallel sidewalls 8 and 10 perpendicular to base 9, which is perforated at 11 for attachment of the retractor to the frame of the vehicle.

In assembling the retractor, notched spacer strip 27 is slipped into corresponding notches 28 in the sidewalls and crimped firmly into place by applying distorting pressure at points 29. Pivot point 12 of pawl bar 13 is inserted into slot 14 of sidewall 10, and extended through, perpendicularly, to the sidewalls until it seats in wedge shaped slot 15 of sidewall 8. Web follower 16 is then attached to the pawl bar by rivets 18.

Now the protruding tubular center portion of split nylon washer 21 (FIGS. 2 and 4) is inserted into opening 19 of sidewall 8, with the side flange on the inner surface, thus lining the surface of opening 19 with a nylon bearing surface. The opening 22 opposite, is similarly lined by inserting the split nylon grommet 23 into this opening, but in this case the grommet or washer is inserted so that the flange remains against the outside surface of sidewall 8. Split grommet 23 is identical to washer 21, with the exception that washer 21 has a wider glange to provide a smooth contact surface for ratchet wheel 24 which will rotate in contact therewith.

The threaded end of reel shaft 32 is slipped into opening 22 of sidewall 10, and while it extends into the channel between the sidewalls, ratchet wheel 24 is slipped over the threaded end of the shaft so that its teeth at the farthest point above the base, slope downwardly and away from the spacer bar 27. The ratchet wheel is now firmly keyed to the shaft by pressing the square center opening onto the matching squared portion 26 of shaft 32.

The cylindrical bearing 31 is now pressed into the nylon-lined opening 19, until the flange is contiguous with the outer surface of sidewall 8.

While holding the flange of bearing 31 to prevent its rotation, the threaded end of reel shaft 32 is inserted into the matching thread of bearing 31 and rotated clockwise until fully seated. Cylindrical bearing surface 43 of reel shaft 32 will now be journaled in sidewall 10, fitting rotatably into the opening 22 which has been nylon-lined by means of grommet 23. Reel shaft 32 with attached ratchet wheel 24 will now rotate freely with bearing 31 journaled in sidewall 8 and bearing surface 43 journaled in sidewall 10. Because of the wedge shaped opening 15, and the opposite wedge shaped opening in slot 14, pawl bar 13 can now rock to a limited degree from a position wherein pawl 33 engages the ratchet of wheel 24, to a second position wherein pawl 33 is out of engagement with the ratchet. Spring 34 may now be connected to the pawl bar by means of opening 35, and at its other end, under tension, to screw 36 which is screwed into sidewall 10 at point 37, thus biasing the pawl bar into locking engagement with the ratchet of wheel 24. The cylindrical shank of retaining member 39 is fabricated so that opposite sides, to a depth substantially equivalent to the thickness of clutch plate 41, are ground to present two flat parallel surfaces to match similar flat parallel female surfaces 42 in the clutch plate, thus the clutch plate 41 may be keyed to the retaining member 39. The retaining member is also recessed to a sufficient depth and diameter to snugly accommodate the reduced diameter of shaft-end 45 of reel shaft 32, so that opening 46 which extends through the retaining member will coincide with opening 47 of the reel shaft 32, thus permitting attachment of the retaining member to the reel shaft, in the manner to be explained later, by the insertion of pin 48.

Next, the small end of cone shaped clutch spring 38 is slipped on retaining member 39. The large end of the spring is then fitted into recess 44 of cam member 17. By compressing the spring, the shank of retaining member 39 can now be pushed through opening 50 in the cam member and keyed into clutch disc 41. This assembly is held against the tension of clutch spring 38, and the end of the reel shaft, now extending from opening 22 of sidewall 10, is inserted into the corresponding opening of retaining member 39, and the connection made permanent by pressing pin 48 through opening 46 of the retaining member and the inline opening 47 of the reel shaft. This insertion is made somewhat difficult by the presence of the spring and cam member on the short shank of the retaining member, but can be accomplished by forceably separating the cam member from the clutch disc against the bias of the clutch spring, thus temporarily exposing opening 46 for insertion of the pin. Although the pin is forced firmly into place, any danger of it slipping out of place is further insured by the cam member which is normally held by the spring directly over opening 46.

As will be noted in FIG. 3, which is a cross section of the cam member, both sides of the cam member are recessed, said recesses being concentric to the circular portion of the cam member, and to the central opening. The outer ring 49, formed by the recess, which is pressed against clutch disc 41, serves as the cooperating clutch surface, thus as the reel rotates, pinned retaining member 39 rotates, carrying with it clutch disc 41 which is keyed thereto. Cam member 17, the clutch surface 49 of which is biased against clutch disc 41, also turns with it, unless prevented from doing so, in which case the clutch surfaces slip, with respect to each other.

The clutch spring permits sufficient freedom so that the cam member can be temporarily lifted away from the clutch disc, and the inside cam placed over the cam follower 51 extending from the end of pawl bar 13.

The cam member 17 is preferably fabricated of a rigid polymeric material such as a polymethyl methacrylate. To the upper edge of the extending arm of the cam member, carrying inside cam 52, there is attached an armature 53 comprising a flat piece of metal mounted in line with, and substantially flush with said upper edge. This armature is attached to the arm by rivet 54, and its upper surface is perpendicular to sidewall 10.

This armature is responsive to a magnetic field, but it is composed of soft iron or any alloy which retains substantially no magnetism when removed from a magnetic field.

Electromagnet 25, in FIGS. 1 and 5, is mounted on sidewall 10 by means of screws 56. Preferably, the holes in the magnet assembly through which these screws pass are slotted, to permit accurate positioning of the magnet with respect to its armature 53.

This electromagnet consists of two pole pieces 57 and 58, the latter having extending arms 59, perforated for attachment to sidewall 10 in the manner mentioned above. These pole pieces are connected with a cylindrical core, and core and pole pieces, as with the armature, are fabricated of soft iron or any allow which becomes magnetic in a magnetic field but retains substantially no residual magnetism when the magnetic field is removed.

The core is wound with insulated electric wire to complete the electromagnet and one end of the wire is grounded so that an electric current flowing through the single wire to the metallic frame of the vehicle to which the retractor is attached, activates the magnet, and magnetically holds the armature against the pole pieces. The inside cam 52 is so contoured that when the armature is magnetically held against the pole pieces of the electromagnet, said armature holds the arm of cam member 17 and consequently the inside cam itself in a position wherein cam follower 51 is blocked by raised portion 61 from reaching the end of the cam slot, although biased in this direction by spring 34. Since the cam follower 51 is attached to the pawl bar, this action prevents the pawl from engaging the ratchet of wheel 24.

In operation, an electric current continuously flows through the magnet, unless interrupted by the opening of an inertial switch or other means, hence unless the magnet is deactivated, the cam, because of the attached armature, prevents the pawl from engaging the ratchet. The reel may therefore rotate freely in either direction.

To complete the assembly, a safety belt having a loop at the end to be fastened to the retractor, is threaded through slot 62, FIGS. 2 and 6 in the reel shaft 32. Rod 63 is inserted into the safety belt loop, and when the loop is pulled into the slot, the loop with contained rod is retained in the enlarged portion of the slot where it is securely held. The loop also becomes flush with the cylindrical surface of the reel shaft, so that the belt may be wound smoothly about it.

Spring case 63 contains spring 64, the outermost turn of which is secured in covered slot 65. The inner turn of the coiled spring ends in flat section 66 for engagement with slot 67 in the threaded end of the reel shaft.

The belt having been secured to the reel shaft as described, is next tightly wound on the shaft by revolving the reel in the direction in which the pawl cannot engage the ratchet. In other words, the teeth of the ratchet move up and away from the pawl as the ratchet reel revolves, in winding the belt on the shaft. When the reel is full, the spring case containing the spring is brought to the outside of sidewall 8, and the flat section 66 of spring 64 is pressed into slot 67 in the threaded end of the reel shaft. The spring case is then held flat against sidewall 8 and carefully rotated counterclockwise as one faces the exterior surface of the spring case, until the spring has enough tension to fully retract the belt. When this has been done, the spring case is fastened to the sidewall 8 by means of screws 68, thus completing the assembly.

FIG. 7 is a diagrammatic representation of a preferred circuit for the application of the retractor of the present invention to the seat belt system of a vehicle. One end of the electromagnet's winding is grounded to the frame of the vehicle at 72. The order or relationship of the components shown is not critical. The other terminal of the winding is here shown as being connected to the vehicle's battery 73. If desired, a resistance 74 can be included in the circuit to limit the current flow to no more than that required for dependable operation. An inertial switch 71 is shown, which is closed at all times except in response to a significant degree of deceleration or acceleration from any direction in a plane parallel to the ground. In the diagram, a pressure switch 75 connecting to the vehicle's hydraulic braking system through tube 76 is shown as connected in series with the inertial switch as back-up. If the pressure switch is conventional, then it may be used in conjunction with a relay which will open the circuit when activated by the pressure switch. Preferably, as assumed in the diagram, the pressure switch, unlike the conventional type, is normally in closed position and opens on the application of pressure.

Generally, with this arrangement, the pressure switch will operate milliseconds before the inertial switch. On the other hand, the inertial switch will operate in case of an unforeseen crash where the brakes have not been applied. This will be true whether the vehicle decelerates because of an object striking it, as being struck in front, while the vehicle is in forward motion, or accelerates in consequence of being struck from the rear or either side.

It should be clear that the magnetically controlled retractor of the present invention can be used with a brake operated switch alone (hydraulic or mechanical), with an inertial switch alone or with both in series, for a wider range of response.

Completing the circuit shown, the vehicle's ignition switch 77, or an independent switch operating together with the ignition switch, is included so that when this switch is in "off" position, there will be no drain on the vehicle's battery.

Figure 8A:
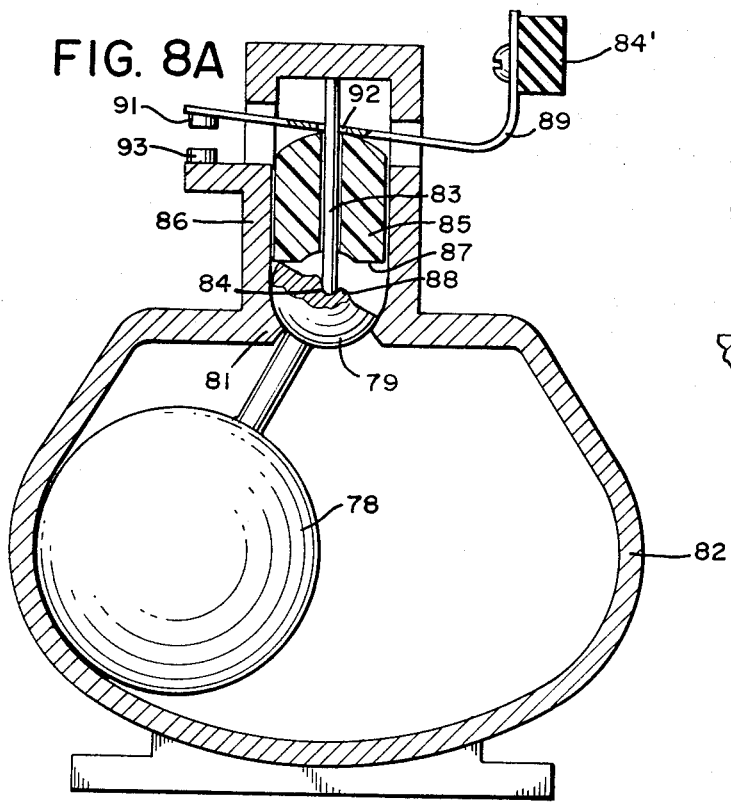
FIG. 8A is the inertial switch of FIG. 8, shown in its open position as a result of the deceleration of the vehicle.

An inertial switch having the desired degree of sensitivity may be used in the circuit. A preferred design for such a switch is illustrated in FIGS. 8, 8A and 9.

A free swinging pendulum 78 pivots from hemispherical bearing 79 which is supported for limited rotary motion in all directions in a plane perpendicular to its axis when in its "at rest" position, by supporting matching seat 81. Outer case 82 provides the limits to this motion. Fixed rod 83 has a rounded end which fits into socket 84 at substantially the center of curvature of hemisphere 79, which point remains fixed regardless of the motion of the hemisphere. This can be seen in FIG. 8A which shows weight 78 responding to acceleration or deceleration of the vehicle to which it is attached. The purpose of rod 83 is to retain the hemispherical bearing in its seat at all times, even though the vehicle may be traveling over very rough roads. It serves further as a guide for lifter 85, restricting it to slideable motion along its vertical axis.

Cylindrical lifter 85 is recessed at its lower end sufficiently to accommodate raised portion 88 which provides sidewalls for the socket 84, so that the annular bottom surface 87 will rest on the outer concentric surface of the hemisphere without interference. The cylindrical lifter 85 is preferably rounded at its top and has an opening longitudinally therethrough to slideably accommodate fixed rod 83. Spring strip 89, preferably spring brass or bronze, carrying at its free end electric contact point 91, and perforated at 92 to permit passage of fixed rod 83, is insulated from the vehicle's frame at 84'. This spring strip is normally positioned directly above, but not in contact with the upper rounded surface of the cylindrical lifter, and biased in electrical contact with corresponding electric contact point 93. Because of the space between the spring strip and the lifter, the contact or switch points will not be opened by the inadvertent minor motions of the pendulum as the vehicle moves over uneven roads or up and down slight grades at a uniform velocity. In response to significant degrees of acceleration or deceleration, however, the pendulum will move to one side, raising an edge of the hemispherical bearing 79, and the light weight cylindrical lifter 85. The lifter will thereupon raise the spring strip 89 and separate the electric contact points 91 and 93, thereby opening the switch.

Figure 9:
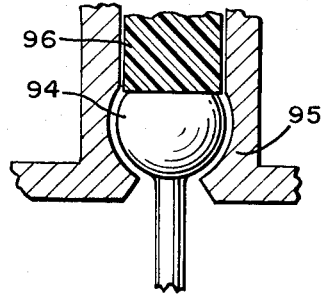
FIG. 9 is a partial cross sectional enlarged view of a modification of the swivel member of a switch which is otherwise similar to that of FIGS. 8 and 8A.

FIG. 9 represents a variation wherein the spherical bearing 94, being a sphere flattened at the top, rather than a hemisphere, is retained in its socket 95 by virtue of its spherical shape. The lifter 96 can be in this case solid, and no fixed rod is required to hold the spherical bearing in place. The amount of lift is somewhat reduced, but still more than sufficient. Preferably, lifters 85 and 96 are fabricated of nylon 6 or other similar polymeric material, although a light weight polished metal lifter is quite satisfactory.

DESCRIPTION OF THE PREFERRED EMBODIMENT

In normal operation, when the ignition system of a vehicle is turned on, an electromagnet 25 holds armature 53 against one or both pole pieces 57 and 58. No motion of the armature need be involved, for normally the armature is adjacent to the pole pieces, and the magnet merely holds it there against its tendency to move away by virtue of the action of clutch disc 41 when the webbing or belt is withdrawn from the reel. In the circumstance that the circuit has been broken and the retractor has latched to limit the forward lurch of the individual using the belt, then the moment the tension has been relieved the retracting spring takes up the slack, and in so doing, the slight angular rotation of the clutch disc 41 urges the armature attached to the rotatable cam member, against the pole pieces.

When the armature is held against the pole pieces by the normally activated electromagnet 25, cam member 17, attached thereto, is in a position such that cam follower 51 is prevented by the contour of the cam from moving pawl 33 to which it is attached, into locking engagement with ratchet wheel 24. As long as the current flows through the magnet winding, therefore, the belt may be withdrawn from the reel against the bias of retracting spring 64, for buckling by the occupant of the seat. Further, the occupant, once buckled, can move about freely with little restriction, with the retractor playing out belting and retracting it, in accordance with the body movements of the wearer.

The current flowing to the magnet may be interrupted by an inertial switch 71, activated by the appreciable deceleration or acceleration of the vehicle, by a switch 75 designed to open upon the initial application of the brakes, or if both are used in series, as shown, by the first one responding to the developing situation.

When the circuit has been broken and the developing deceleration causes the belted occupant to begin to lurch forward, the first partial rotation of the reel in response to this motion rotates the cam member 17 to a position where the cam no longer prevents the cam follower from moving. Because of the curvature of the inside cam, it permits spring 34 to urge pawl 33 into locking engagement with ratchet wheel 24, thus preventing any further extension of the webbing, and restraining the occupant of the seat.

It should also be noted that webbing follower 16 also prevents latching of the ratchet and pawl when the reel is full, by physically holding the latch bar away from the reel, thus the first few inches of webbing may be withdrawn from the retractor without restriction, even if the circuit which includes the magnet winding, is open.

The operation of an inertial switch and pressure-sensitive hydraulic switch for use in a brake system have previously been discussed.

Many modifications or variations of the present invention are possible in the light of the above teachings. It is, therefore, to be understood that within the scope of the appended claims, the invention may be practiced otherwise than as specifically described.

I claim:

1. A safety belt retractor adapted for use with a seat belt in a vehicle, said retractor comprising:
   a. a support having a base, two substantially parallel sides and a tongue adapted for attachment to the frame of the vehicle, each of said walls having openings for the components of the belt retractor, including a pawl bar assembly with biasing means;
   b. a reel assembly adapted for connection to a seat belt, said reel being journaled in the parallel walls of the support for rotation in a winding direction and in the opposite unwind direction; said reel assembly having at least one circular ratchet wheel and a shaft for a belt to be wound thereon, said ratchet wheel being concentrically attached to the shaft and having ratchet teeth in its periphery for engagement with the pawl bar upon rotation of the reel in one direction;
   c. a cam follower attached to the pawl bar;
   d. a cam arranged for cooperative action with the cam follower, said cam having a first position in which the pawl bar is biased into latching engagement with the ratchet wheel and a second position in which the pawl bar is out of engagement with the ratchet wheel;
   e. an armature attached to the cam being responsive to a magnetic field;
   f. an electromagnet normally electrically activated and in contact with an armature which is magnetically retained in contact therewith;
   g. a cam member attached thereto which is thereby normally held in a first position in which the pawl does not engage the ratchet wheel; and
   h. means for interrupting the electrical activation of the magnet, thereby releasing the armature and allowing the cam to move into a second position wherein the pawl bar is biased into locking engagement with the ratchet wheel.

2. The safety belt retractor of claim 1 wherein said means for interrupting the electrical activation of the magnet comprises a hydraulic pressure sensitive switch connected to the hydraulic brake system of the vehicle to which the retractor is attached, said switch normally being closed but opening in response to an increase in pressure in the hydraulic brake system.

3. The safety belt retractor of claim 1 wherein said means of interrupting the electrical activation of the magnet comprises an inertial switch, the switch points of which are normally closed but which open in response to an appreciable change in the degree of deceleration or acceleration of the vehicle.

4. The safely belt retractor of claim 1 in which the means for interrupting the electrical activation of the magnet comprises two switches acting in series, one of which is a pressure sensitive switch responsive to the pressure of the fluid in the hydraulic brake system of the vehicle and the other an inertial switch responsive to appreciable changes in the deceleration or acceleration of the vehicle to which the switch is attached.

5. A safety belt retractor having a reel rotatably mounted on a supporting member; a safety belt anchored and wound on the reel for withdrawal against bias in the rewind position; said reel having atleast one flange with ratchet teeth in its periphery for latching engagement in the unwind direction with a pawl having a latched position and an unlatched position, biased to the latched position; a cam follower attached to the pawl to follow a cam having a first position wherein the pawl is allowed to move as a result of its bias to the latched position and a second position wherein the pawl is prevented from moving to its latched position, said cam being held in the second position by the response of an armature attached thereto to a normally activated electromagnet, and said cam being released by deactivating the electromagnet to allow the pawl, in response to its bias, to engage the ratchet teeth of the flange in latching engagement; and wherein the means for deactivating the electromagnet is an inertial switch, said inertial switch comprising a pendulum, free to swing from a downwardly positioned hemispherical bearing seated for limited rotary motion in a matching concave hemispherical seat, with a bottom aperture for a rod attaching the pendulum bob to the hemispherical bearing; a fixed shaft, the lower end of which fits into a depression at substantially the center of curvature of the hemispherical bearing; a cylindrical lifting member having a diameter at least substantially equal to that of the hemispherical bearing and having a longitudinal opening for slideably positioning on the fixed shaft; a spring strip passing over and above the lifting member and substantially in contact with it, said strip having an opening through which the fixed shaft may pass, said strip being insulated from the frame at one end and having a contact point at the other biased downwardly in contact with another point, whereby, when the pendulum swings an appreciable amount, the lifter will press against the spring strip and separate the contact points, thereby opening the switch.

6. A safety belt retractor adapted for use with a seat belt in a motor vehicle, comprising: a supporting member; a reel rotatably mounted on said supporting member; a safety belt anchored to and wound on said reel; a biasing means mounted on said reel and biasing said reel in the rewind position against withdrawal; a flange mounted on said reel, said flange having ratchet teeth; a pawl having a latched position in engagement with said ratchet teeth and said pawl having an unlatched position when disengaged from said ratchet teeth; biasing means for said pawl, biasing said pawl in said latched position; a cam follower attached to said pawl; a cam mounted on said reel, said cam having a first position wherein said pawl is allowed to move as a result of its bias to said latched position and a second position wherein said pawl is prevented from moving to its latched position; an armature mounted on said cam, a normally activated electromagnet mounted on said supporting member; means for deactivating said electromagnet; a clutch disc mounted on said reel and rotating as said reel rotates, said cam being biased against said clutch disc, said cam turning with said clutch disc unless being prevented from doing so by said electromagnet, said cam being held in said second position by the response of said armature to said normally activated electromagnet, and said cam being released by deactivating the electromagnet to allow the pawl, in response to its bias, to engage said ratchet teeth of said flange in latching engagement.

7. The safety belt retractor of claim 6 wherein said means for deactivating said electromagnet comprises an electric switch responsive to the application of the brakes in said vehicle in which said retractor is used.

8. The safety belt retractor of claim 7 wherein said electric switch comprises two switches connected in series, one switch being an inertial switch, the normally closed contacts of which open in response to deceleration or acceleration of the vehicle, and the second switch being a hydraulic pressure switch having normally closed contacts which open in response to pressure in the hydraulic brake system in said vehicle.

9. The safety belt retractor of claim 6 wherein said means for deactivating said electromagnet is an inertial switch.

10. The safety belt retractor of claim 6 and further comprising an electrical circuit for holding the retractor in an unlatched position, said electrical circuit including the windings of said electromagnet attached to said safety belt retractor, a service battery in said vehicle to which said retractor is electrically connected, and at least one normally closed switch which opens as a result of an appreciable change in the velocity of the vehicle.

11. The safety belt retractor of claim 10 and further comprising an additional normally closed switch which opens upon application of the brakes of said vehicle.

* * * * *